Inventor:
Carl R. Seaward,
by *Harry E. Dunham*
His Attorney.

Jan. 3, 1950     C. R. SEAWARD     2,493,600
SWEEP CIRCUIT
Filed Nov. 17, 1944     4 Sheets-Sheet 4

Inventor:
Carl R. Seaward,
by Harry E. Dunham
His Attorney.

Patented Jan. 3, 1950

2,493,600

UNITED STATES PATENT OFFICE 2,493,600

SWEEP CIRCUIT

Carl R. Seaward, Scotia, N. Y., assignor to General Electric Company, a corporation of New York Application November 17, 1944, Serial No. 563,936

8 Claims. (Cl. 250—27)

My invention relates to sweep circuits for cathode ray oscillographs and its object is to provide a sweep circuit of exceptionally good synchronizing ability, either with constant or variable frequency alternating voltages or random impulse voltages, which is capable of operation over a wide sweep speed range of, say, from 1 to 100,000 microseconds, and is capable of producing up to 250,000 or more sweeps per second. This sweep rate was formerly unobtainable when using a gas-filled triode as a sweep generator.

Figure 1:
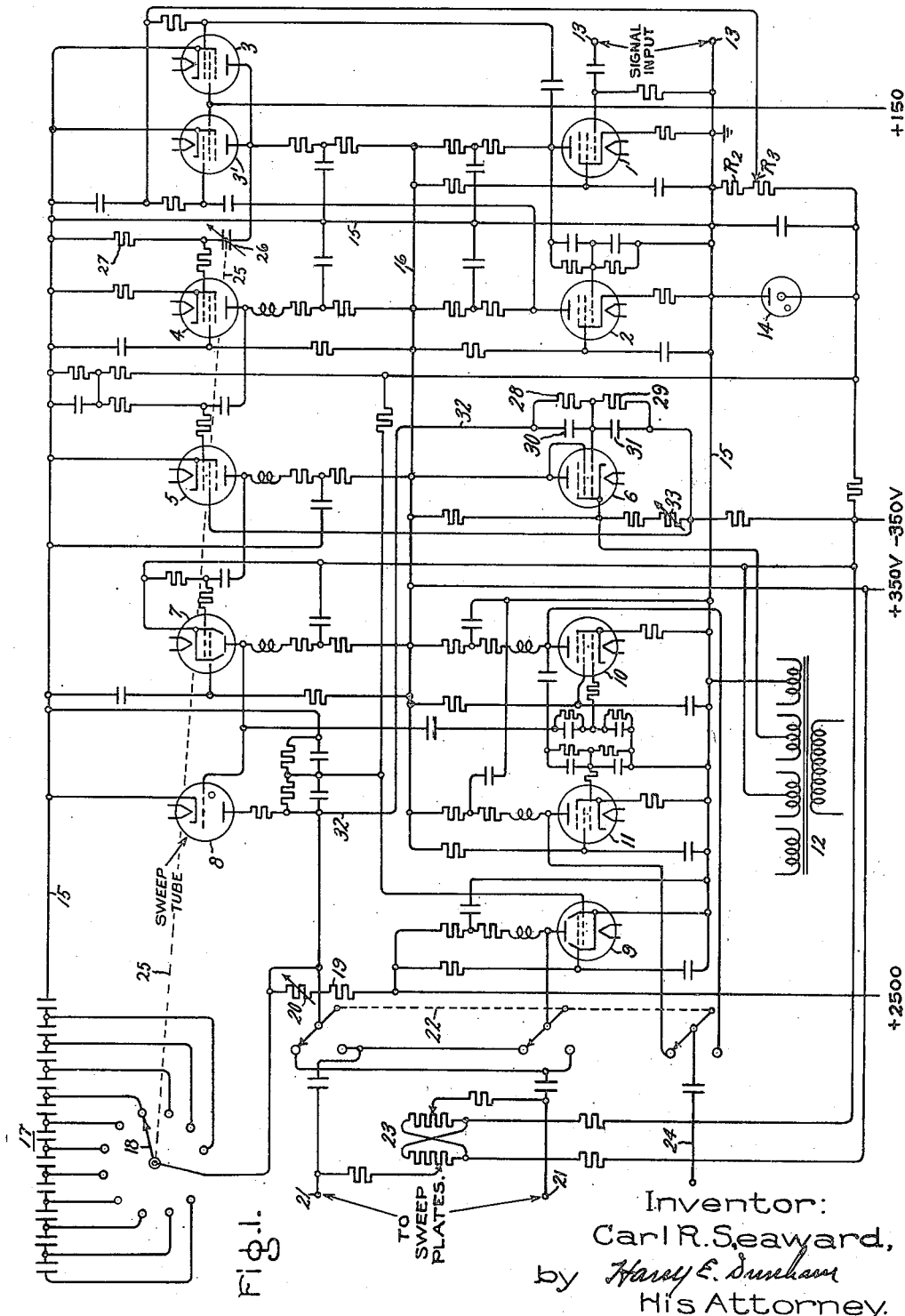
Figure 2:
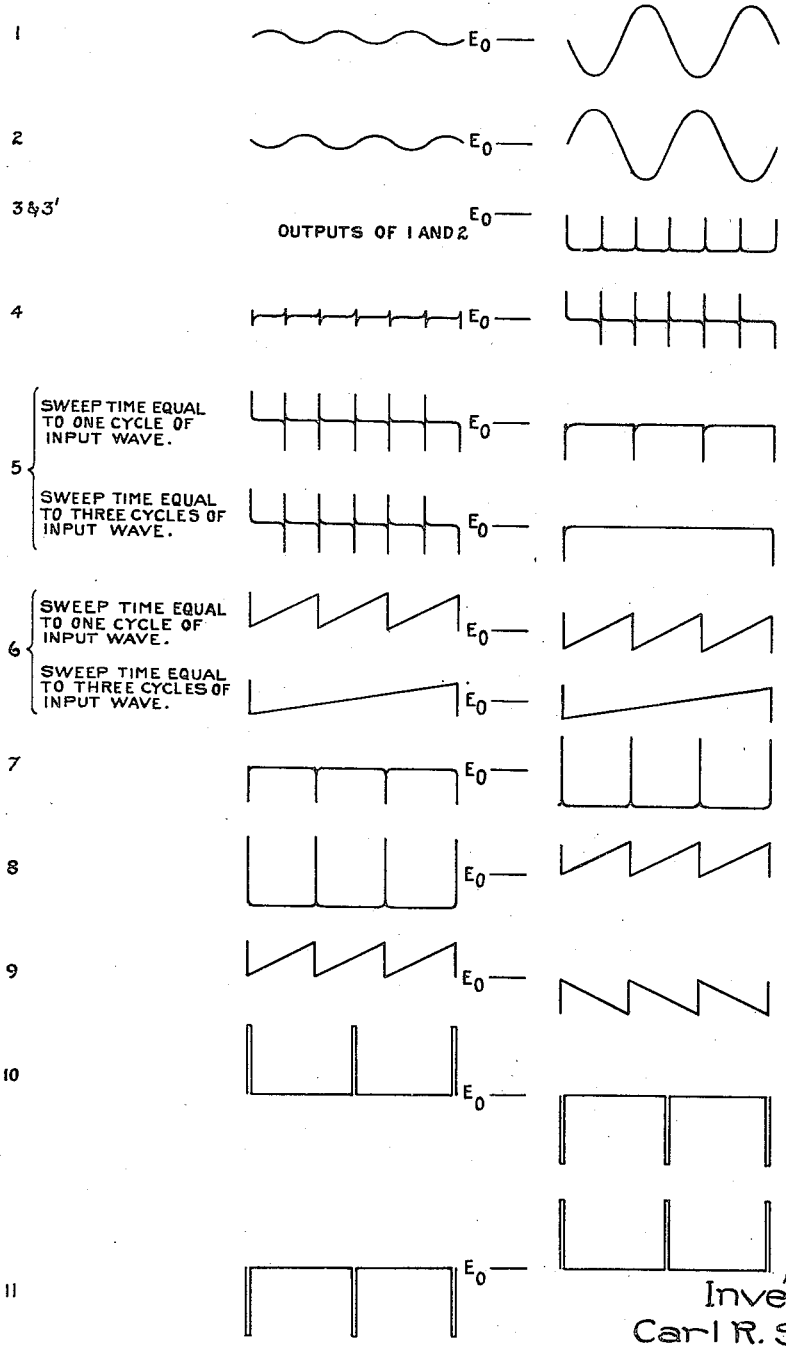
Figure 8:
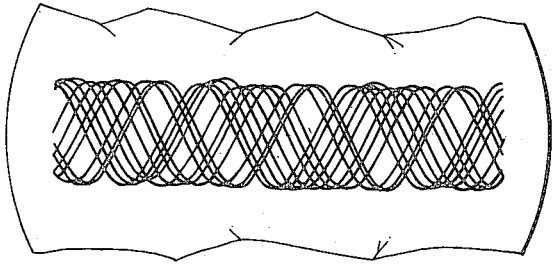
Figure 9:
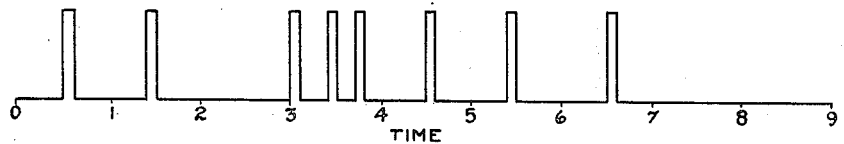

The features of my invention which are believed to be novel and patentable will be pointed out in the claims appended hereto. For a better understanding of my invention, reference is made in the following description to the accompanying drawing in which Fig. 1 represents a wiring diagram of my improved sweep circuit and including certain features which may be used or omitted, as desired; Fig. 2 shows a series of time coordinated voltage curves which will be referred to in explaining the invention and which represent typical input and output voltage impulses at various parts of the sweep circuit. Figs. 3 to 7 and 10 represent typical cathode ray oscillograph trace images which will be referred to in explaining the various adjustments of my improved sweep circuit. Fig. 8 represents a type of blurred image frequently obtained with prior art sweep circuits because of imperfect synchronism. Under similar conditions a clear image is obtained with my invention. Fig. 9 represents irregularly occurring voltage waves of which a clear trace may be obtained by the use of my invention.

In the lower portion of Fig. 1 there are represented direct current power supply terminals for the sweep circuit with voltage and polarity designations suitable for the purposes intended. Twelve (12) represents a transformer for supplying cathode heater circuits for the various electron discharge devices employed. To avoid confusion, these heater circuits have not been completed on the drawing. Connections are made from the centers of certain of the transformer secondaries to desired points of direct current voltage, so as to establish low voltages between the heater and cathode of the corresponding tubes.

The input signal with which the sweep voltage is to be synchronized is applied between terminals 13 at the lower right of Fig. 1. Ordinarily some value of the signal voltage applied to the input terminals 13 will also be applied to the vertical deflection plates of the cathode ray tube (not shown) for which the sweep circuit is intended, and the sweep voltage produced by the apparatus to be described is synchronized with such signal voltage in order that the pattern on the oscillograph screen will be and will remain stationary. It is noted that the lower input terminal is connected with the grounded bus system 15 of the sweep circuit system. It will be helpful to note that the horizontal bus across the top of Fig. 1 is also a part of the grounded bus system 15, and that the bus 16 running horizontally through the central portion of Fig. 1 is a part of the +350 volt direct current supply bus. In the upper left portion of Fig. 1 are a number of condensers 17, one or more of which may be connected in series by a switch 18 across a charging circuit from the +2500 volt supply terminal through resistances 19 and 20, the latter being adjustable, to the ground bus 15. The connected capacitance represented at 17 is the capacitance which is discharged through a gaseous sweep tube 8 to provide the sawtoothed wave sweep voltage. This voltage is applied across the sweep terminals 21 at the central left in Fig. 1, which are to be connected to the horizontal sweep plates of the cathode ray tube to be operated. The direction in which the sweep voltage is applied to the sweep terminals and the sweep speed range is controlled by the two upper blades of a switch 22. At 23 is a potentiometer connected across the 700-volt direct current supply for adjusting the initial or zero voltage across the sweep terminals 21 and is used to adjust the horizontal position of the cathode ray pattern. At 24 is a blanking circuit terminal that may be used as hereinafter explained.

The apparatus as thus far described is in general similar to existing sweep generator apparatus. However, my invention pertains to the control of the firing of the sweep tube 8 in response to an input signal in such a manner as to avoid certain difficulties heretofore encountered in this type of apparatus. The nature of these difficulties may be described briefly as follows:

A sawtooth wave is quite often generated by repeatedly charging a capacitor from some voltage source and suddenly discharging the capacitor through a gas-filled triode when the capacitor has been charged to a predetermined voltage. The usual sweep circuit using a gas-filled triode to generate a sawtooth wave is free running. By free running is meant that the triode conducts as soon as any one of a number of combinations of anode-to-cathode voltage and grid-to-cathode voltage is reached regardless of whether a synchronizing voltage is applied. The voltages required for tripping are also somewhat affected by the temperature of a gas-filled triode. This variation due to temperature is usually a fraction of a volt but with slowly increasing grid voltages the time variation of tripping is appreciable.

The usual sweep circuit using a gas-filled triode to generate a sawtooth wave is synchronized by adding a voltage from the source used for synchronizing directly to the anode-to-cathode voltage of the sweep tube with a fixed grid bias on the sweep tube; or the synchronizing voltage is used to modulate the grid voltage of the sweep tube. These methods work fairly well when the sweep time is nearly an exact multiple of the time for one cycle of the synchronizing voltage and when the synchronizing voltage is high enough and its wave front steep enough. Usually the adjustments have to be changed continually to keep the image on the cathode ray tube screen still and not to have it appear to run first one way and then the other.

With my newly designed sweep circuit the grid circuit of the sweep tube 8 is very stiff. By this I mean that the grid circuit has low impedance, low time constant, and capability of high frequency response, which conditions are necessary if the actual grid voltage is to be changed at the necessary rate. Circuit stiffness also implies that considerable energy is required to swing the grid voltage, a condition which gives stability. It is the manner in which the sweep tube grid voltage is controlled that makes this circuit much superior to others using gas-filled tubes and makes possible operation at high repetition rates and at higher rates of rise of sweep voltage. The grid is normally 200 to 300 volts negative with respect to the cathode. The tube is tripped (synchronized) by swinging the grid from 200 to 300 volts positive in a small fraction of a microsecond and immediately swinging it back to its normal negative voltage. If the actual trip voltage varies a volt or so, the corresponding time variation is insignificant. This change in grid voltage is governed by the input voltage, and is the same regardless of input voltage crest value, polarity, or the slope of the wave front. Every time the input voltage exceeds a predetermined value of voltage positive or negative, a tripping pulse is generated. Whether the pulse is applied to the sweep tube depends on other circuit adjustments to be discussed later.

In the system of Fig. 1 the sweep tube 8 and the voltage regulator tube 14 are gaseous discharge tubes. All of the other tubes shown are of the high vacuum type. Some have screen and suppresser grids as shown. Tubes 1, 2, 4, and 7 are normally conducting, and tubes 3, 3', 5, 6, and 8 are normally cut off. Tube 8 is fired in response to an input signal at 13 through the vacuum tubes 1, 2, 3, 3', 4, 5, 6, and 7, the operation of which will now be described in the order mentioned in connection with the coordinated voltage curves of Fig. 2. In Fig. 2 the first column indicates the stages corresponding to tubes of the same number in Fig. 1, column 2 represents the approximate input voltage wave shape, and column 3 the approximate output voltage wave shape. In each case the zero voltage line $E_0$ is indicated, $E_0$ being the voltage of the neutral bus 15.

Assume now that the sine wave voltage indicated for the input to stage 1 is impressed across input terminals 13. Tube 1 which is normally conducting will have its current increased by the positive signal, lowering the voltage drop in the tube and causing its anode voltage to drop. Likewise, when the input signal voltage is negative, the current through tube 1 will decrease and the anode voltage will rise. Tube 1 is thus an amplifier tube which amplifies the input signal wave shown at the top of the third column of output wave shapes in Fig. 2. The output voltage of tube 1 is impressed on the capacitance coupled control grid of tube 2. Tube 2 acts as an inverter to produce a voltage output wave opposite to that of tube 1; that is, when the voltage output of tube 1 is positive, the voltage output of tube 2 is negative and vice versa. The output voltages of tubes 1 and 2 are impressed on the control grids of the pentodes 3 and 3' which are normally biased to cutoff by the voltage drop across fixed resistor $R_2$ and the potentiometer $R_3$. The negative bias of the grids of tubes 3 and 3' is adjustable beyond cutoff by potentiometer $R_3$. This setting determines at what point of the input wave the synchronizing pulse occurs. The action of tubes 3 and 3' is to combine, to square up the voltage waves by the amplification and saturation of tubes 3 and 3', and to rectify the output voltages of tubes 1 and 2, resulting in the double frequency negative squared wave voltage output represented in Fig. 2. It is to be noted that the tubes 1, 2, 3, and 3' are supplied by being connected between the neutral bus 15 and the positive bus 16, the plates being connected to the positive bus through resistances. The coupling capacitor 26 and resistor 27 between stages 3 and 4 are selected so that the combination has a low time constant, so as to pass only high frequencies. This causes the input to tube 4 to be a series of short pulses, as shown in Fig. 2, because only the steep slopes of the output voltage waves of tubes 3 and 3' can get through the coupling circuit. The resulting low voltage pulses are inverted and amplified by tube 4 as represented in Fig. 2.

The capacitor 26 may be termed a pulse duration capacitor. It is variable, being composed of several capacitors which are switched by a second and third pole of switch 18. Dotted line 25 represents driving connection between capacitors 17 and 26. These individual capacitors are chosen so that the time duration of the pulses is the same as the discharge time of the capacitor 17 in use. That is, the RC of resistor 27 and capacitor 26 is equal to the time required to discharge capacitor 17 when R is ohms, C is microfarads, and the discharge time is in microseconds. The arrangement gives the minimum possible retrace time for the sweep because gas-filled triode 8 will not deionize until its grid is sufficiently negative again. Since this pulse also controls the blanking of the beam of the cathode ray tube on the return trace, the blanking time is the same as the retrace time.

The output of stage 4 is fed to the capacitance coupled control grid of tube stage 5 which tube is normally biased to cutoff, so that it discriminates against negative input voltages. The firing of tube 5 is also controlled by the voltage on its screen grid which is controlled by tube 6 as will presently be explained, and tube 5 does not necessarily fire every time a positive voltage pulse from tube 4 is applied to its control grid. However, when tube 5 does fire, it controls tube 7. It is noted that tube 7 is supplied by being connected between the −350 volt supply terminal and the +350 volt bus, with the cathode connected to the negative side and with resistance between the anode and positive side. It is biased so that with no signal on its grid it is normally conducting and has an anode voltage of the order of 250 volts negative. Upon receiving a pulse on its capacitance coupled grid from the output of tube 5, the control grid of tube 7 momentarily becomes sufficiently negative to cut off current flow in tube 7, whereupon its anode becomes approximately 250 volts positive. This sudden change occurs in a small fraction of a microsecond. This change in voltage is applied to the grid of gaseous sweep tube 8. The cathode of tube 8 is at ground potential, so that it immediately becomes conducting and discharges the connected sweep capacitance at 17. The input pulse to tube 7 has a time duration just long enough to allow capacitance 17 to be discharged and a very steep front, and, hence, the cutoff of tube 7 is substantially instantaneous and it immediately becomes conducting again. Hence, the voltage applied to the control grid of gaseous tube 8 goes from about 250 volts negative to about 250 volts positive and back to 250 volts negative substantially instantaneously during which instant the sweep capacitance discharges and is immediately cut off. In particular, it is important that the change from the negative to the positive voltage be fast. This change, that is from −250 volts to +250 volts, occurs in less than ¼ microsecond. The change back to the −250 volts will of course depend upon the length of tripping pulse which, as will be explained, varies. It is generally believed that when a gaseous tube becomes conducting, the control grid loses control, and that the only way to stop conduction is to remove the positive plate voltage completely for a time long enough for the tube to become deionized. It would appear then that tube 8 should remain conducting and continue to discharge the charging current of the capacitance at 17. Such is not the case. The capacitance is substantially completely discharged immediately after the grid of tube 8 becomes positive; hence, the plate voltage across the tube drops to a low value. The tube is in operation for only an instant and is deionized quickly by the sudden rise of the grid voltage to a high negative voltage. The combination of circumstances positively cuts off the operation of gaseous tube 8 substantially instantaneously and the sweep voltage rises again at a rate depending upon the setting of the charging resistance 20 and the setting of switch 18.

The grid of the sweep tube 8 is so far negative normally that the tube cannot be tripped without the synchronizing voltage pulse and consequently cannot run free. Having the grid of the gas triode several hundred volts negative before the end of conduction tends to make deionization occur at the same anode-to-cathode voltage, that is, at the same level of anode current. This high negative bias also allows the tube to withstand faster rates of rise of anode-to-cathode voltage immediately after conduction has ceased without restriking. With a low bias the tube would be unable to regain control when the anode-to-cathode voltage rate of rise is large and consequently, a high repetition rate of sweeping would not be possible.

As mentioned previously, the operation of tube 5 is also subject to the control of tube 6, and this control by tube 6 is responsive to the value of sweep voltage as will now be explained. The screen grid voltage of tube 5 is obtained by direct coupling to the negative cathode side output of tube 6, which tube is normally biased to cutoff. Tube 6 control grid is coupled to the positive side of the sweep voltage output by a resistance capacitor divider comprising resistances 28 and 29 and condensers 30 and 31, the connection to the sweep voltage output being through the connection 32. Hence, with no positive sweep voltage tube 6 is cut off, and the screen voltage of stage 5 is negative and stage 5 is blocked, even though its grid voltage may be such as otherwise to fire the tube. A variable resistor 33 connected between the cathode and grid return of tube 6 makes it possible to control the gain of stage 6; that is, control the value of the screen voltage of tube 5 for any given value of the positive sweep voltage. If the sweep voltage rate of rise is high enough so that the sweep time is equal to or less than the time for one cycle of the input voltage at 13 and the gain of stage 6 is a maximum, the sweep voltage and consequently the screen voltage of stage 5 will be high enough so that tube 5 becomes operative and passes all of the amplified pulses of a given frequency on to tube 7. By reducing the rate of rise in sweep voltage by cutting in resistance at 20 and changing the sweep capacitor capacitance by switch 18 or by reducing the gain of tube 6, or both, one or more consecutive synchronizing impulses of such given frequency may be skipped. Likewise, if the frequency of the synchronizing input voltage is increased for a given setting of the controls just referred to, some of the synchronizing impulses will be skipped. When the time for one cycle of the input voltage is less than the time of a single sweep, two or more cycles of the input signal voltage may be made to appear in a row across the cathode ray tube screen by skipping synchronizing impulses. Generally the preferred adjustment will be such as to spread the image over as large a portion of the screen as possible irrespective of its frequency of occurrence. The control here referred to is independent of the voltage of the input signal. Hence, with a given setting of the controls the image of the input voltage will be synchronized whether one or more impulses are skipped or not, and the image obtained will not move across the screen but will remain stationary. However, if the settings are such that an uneven number of half-cycles of the input voltage appear on a single sweep, there will be two images 180 degrees out of phase with one another. This situation is readily controlled by increasing or decreasing the gain of tube stage 6 so as to obtain tripping with an even number of half-cycles of input voltage.

In Fig. 2 the input and output voltages of tubes 5 and 6 are shown where the sweep time is equal to one cycle and also where it is equal to three cycles. The input and output voltage curves for tubes 7 and 8 in Fig. 2 are for a sweep time which is equal to one cycle of the input wave. It is noted in Fig. 2 that the output waves of tube 6 are one-half and one-sixth of the input frequencies to stage 5. This is because of firing of tube 5 was blocked by correspondingly low screen grid voltages under the control of tube 6, at times when tube 5 would otherwise have fired.

Where only positive input voltages are to be recorded, tubes 2 and 3' may be omitted. In some cases where feeble input voltages are encountered, it may be desirable to include additional stages of amplification ahead of the input terminals. If the input voltage is too high, a resistor capacitor divider should be used to reduce it to a suitable value.

The functions of tubes 9, 10, and 11, while not essential to my invention, are as follows: Tube 9 may be included to improve the focus of the cathode ray beam on the screen. This tube is normally conducting and acts as an inverter to supply the negative half of the sweep voltage. This balances the voltages on the horizontal or sweep deflection plates about ground. Tube 10 is for blanking purposes. The control grid of tube 10 receives a positive signal from the anode of tube 7 through a capacitor resistor divider. Tube 10 puts out a negative pulse wave which is applied to the control grid of the cathode ray tube to blank the beam on the return trace when the lower sweep speed ranges are used.

Stage tube 11 inverts the output of stage 10 and supplies a positive pulse wave which is applied to the control grid of the cathode ray tube through the lower blade of switch 22 when in the position shown to turn on the beam when the higher sweep ranges are used. For a given cathode ray tube beam current, a function of control grid voltage, and a given accelerating voltage the brilliancy of the trace on the cathode ray screen varies inversely as the sweeping speed. Hence it is necessary to drive the cathode ray control grid more positive to increase brilliancy for high sweep speeds and more negative for blanking the beam. In the case of prior sweep circuits known to applicant, the ratio of speeds of the back and forward sweeps is on the order of 10 to 1 and is about the same for all sweep speeds. In the case of my sweep circuit this ratio of back sweep to forward sweep speed in much higher, especially at the lower sweep speeds. The ratio could be about 50 to 1 for a 5 microsecond sweep and 2000 to 1 for a 100,000 microsecond sweep. When switch 22 is in the lower position connecting circuit 24 to the plate of tube 10, and corresponding to low sweep speeds, the cathode ray beam is normally turned on. A negative squared wave of voltage is applied to the cathode ray tube control grid during the back sweep to turn off the beam. Blanking is not of much importance with this connection because of the great difference in brilliancy on the back sweep and the forward sweep. When switch 22 is in the position shown, which is the position for high sweep speeds, the grid control circuit 24 is connected to the plate of tube 11. The beam is normally off and a positive squared wave of voltage is applied to the cathode ray tube control grid to get the necessary brilliancy on the forward sweep, which occurs while the sweep tube is conducting. For this condition it is essential to intensify the beam for the forward sweep and to turn it off on the back sweep because of the much greater brilliancy on the back sweep when the cathode ray tube control voltage is fixed. This explains why blanking is more important at the higher sweep ranges.

The rate of rise of the sweep voltage is controlled by the resistance capacitor circuit 17, 19, 20. The capacitance 17 is variable in steps and enough of the series resistance is continuously variable to make the sweep voltage rate continuously variable. The ranges obtainable overlap by changing the capacitance.

The important features of the circuit may be reviewed briefly as folows: In general the circuit receives a relatively low voltage wave with a slow front at the input terminal. This wave is amplified and inverted. The wave and the inverted wave are combined, squared up by amplification and saturation, and rectified so as to get a wave of the same wave form and polarity for each half-cycle of the input wave. This wave is then clipped so as to get a narrow pulse at the beginning of each wave. This pulse is then amplified sufficiently to be able to swing the grid of the sweep tube about 500 volts. The screen grid voltage of one of the amplifier tubes is modulated from the sweep voltage, making it possible for the sweep to continue for more than one-half cycle of the input voltage.

Figure 3:
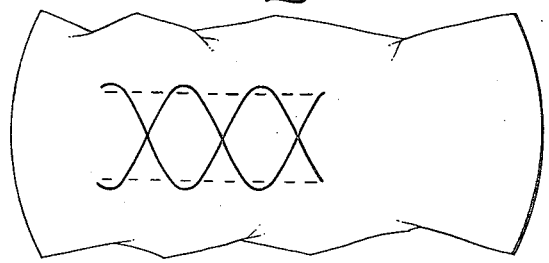
Figure 4:
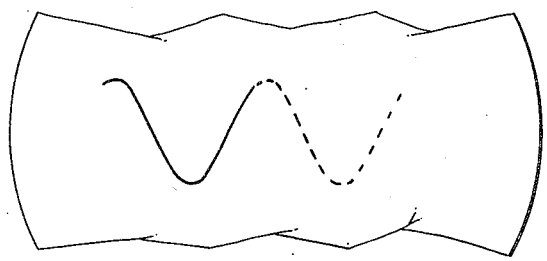
Figure 5:
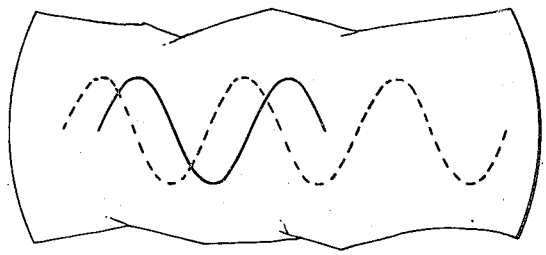
Figure 6:
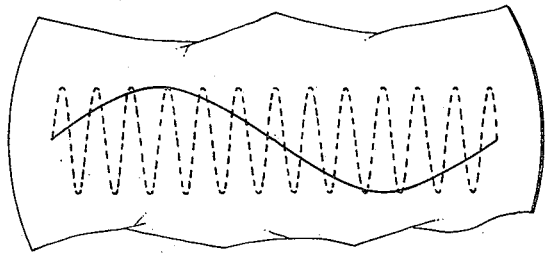

As an example of how to adjust the circuit to get a desired image on the screen of the cathode ray tube, we will assume that we have connected the circuit to a voltage source of unknown frequency and crest value, and have found the pattern shown in Fig. 3 on the cathode ray tube screen. We find two waves of one and one-half cycle duration which start just before crest voltage is reached. The dotted lines indicate the path of the back sweep which is normally blanked out. By increasing the gain of tube 6, we can get a single trace of one cycle duration as shown in Fig. 4 by the solid line. If we decrease the gain of tube 6 sufficiently, we will get a single trace of two cycles duration as shown in Fig. 4 by the solid and dotted line. By reducing the bias of tubes 3 and 3' by adjusting R₃, it is possible to have the trace start near the zero line as shown in Fig. 5 by the solid line. If the beam zero position is moved to the left by changing the adjustment of the beam positioning potentiometer at 33 and the gain of tube 6 still further decreased, we can utilize the full screen and get a three cycle trace as shown by the dotted line in Fig. 5. If we increase the rate of rise of the sweep voltage sufficiently by changing controls 18 and 20, we will get a single cycle trace across the screen without changing any other controls as shown by the solid line in Fig. 6. If the rate of rise of sweep voltage is decreased sufficiently by changing controls 18 and 20 and the other controls are unchanged, a relatively large number of cycles will appear on the screen as shown by the dotted line on Fig. 6.

Figure 7:
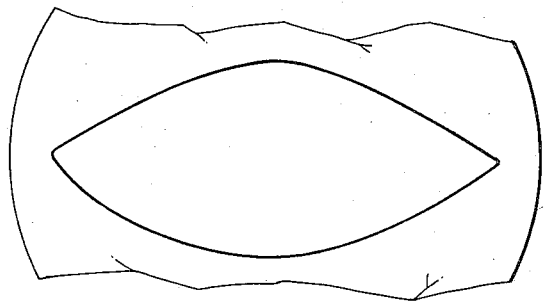

It is possible to get a figure consisting of two one-half cycle traces as shown in Fig. 7 by increasing the gain of tube 6 and the sweep voltage rate of rise sufficiently. A single half-cycle trace could be had by making either tube 3 or 3' inoperative. The polarity of the half-cycle trace would be determined by the tube remaining operative. One tube could be made inoperative by disconnecting it anode or by separately controlling its bias voltage.

The running blurred image shown in Fig. 8 occurs frequently with conventional sweep circuits and heretofore could be controlled only by frequent readjustment when a few cycles of relatively low frequency are shown on the screen and not at all if there are many cycles of a relatively high frequency. This condition occurs because the sweep is being tripped at many different values of the voltage used for synchronizing. In my newly designed sweep circuit the time of occurrence of the synchronizing pulse with respect to any selected value of input voltage is very precisely controlled. Consequently, the trace starts at the same voltage each time and the image remains still. No matter how the controls are set or whether the wave form, frequency, or crest voltage of the input voltage changes within wide limits, the pattern traced by the cathode ray beam will remain in synchronism and only the time duration of the individual sweeps will change.

*Synchronism of unevenly spaced pulses*

Figure 10:
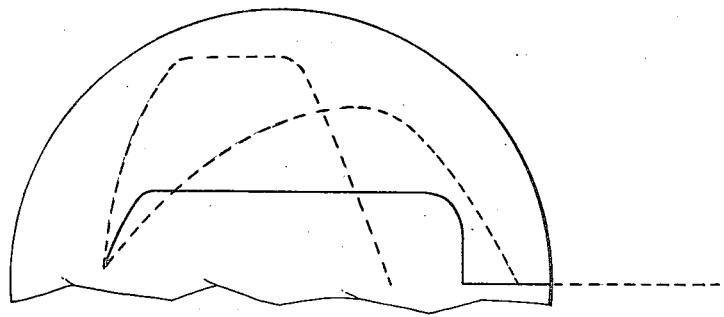

Suppose we have voltage pulses of like wave form but of irregular occurrence as shown in Fig. 9. So long as the time between pulses is at least a small fraction of the time of a pulse duration, a standing trace of a single pulse can be made to appear on the screen while utilizing most of the screen as shown in Fig. 10 by the solid line. This is accomplished by adjusting the rate of rise of the sweep voltage, controls 18 and 20, so that the time for one sweep is a little longer than the time width of a single pulse but shorter than the sum of the time width of a pulse and the shortest time interval between pulses, and making the gain of stage 6 sufficiently high to allow tripping on every pulse. When this is done, the beam is swept off the screen to the right after each pulse. The time between sweeps is irregular but the sweep starts at the same value of voltage on each wave so only a single trace is seen on the screen. If the pulses differ in wave form as well as time spacing, other traces starting at the same point on the screen will appear as shown by the dotted lines in Fig. 10.

In Figure 1 there are various resistances and other circuit elements which are not mentioned. These are usual circuit elements used in electronic circuits having values suitable for the voltages used and the results desired.

What I claim as new and desire to secure by Letters Patent of the United States, is:

1. In a sweep circuit for cathode ray oscillographs, a capacitance, a circuit for gradually charging the capacitance, a grid controlled gaseous discharge tube through which said capacitance is suddenly discharged, electronic means including a normally conducting grid controlled vacuum tube for controlling the grid voltage of said gaseous discharge tube from at least 200 volts negative to at least 200 volts positive in less than ¼ microsecond and then back again to said negative voltage to allow the substantially instantaneous discharge of the capacitance through the gaseous discharge tube and its cutoff before the capacitance is completely discharged, the voltage swing on the control grid of the gaseous discharge tube being at least 400 volts and its negative value being sufficient to prevent refiring of the gaseous tube even though there is a rapid increase in the voltage across the gaseous tube immediately following its cutoff such as would otherwise cause refiring of the tube.

2. In a sweep circuit for cathode ray oscillographs, a capacitance, a circuit for gradually charging said capacitance including means for adjusting the charging rate, a grid controlled gaseous discharge tube through which the capacitance is discharged, electronic means including a normally conducting vacuum tube for controlling the voltage on the grid of the gaseous tube from a voltage of the order of −250 volts when the vacuum tube is conducting to a voltage of the order of +250 volts when the vacuum tube is cut off, means responsive to a signal for controlling said vacuum tube so that it is momentarily nonconductive whereby the voltage on the grid of the gaseous discharge tube changes from the negative to the positive voltage and back to the negative voltage mentioned substantially instantaneously and causes the discharge of the condenser through the gaseous tube in the meantime and its cutoff at a substantially fixed low value of discharge current before the capacitance is completely discharged.

3. In a sweep circuit for cathode ray oscillographs, a capacitance, a circuit for gradually charging said capacitance at an adjustable rate, a grid controlled gaseous discharge tube for discharging said capacitance, a normally conducting grid controlled vacuum tube for controlling the grid voltage of the gaseous tube, a normally nonconducting grid controlled vacuum tube rendered conductive in response to signals to be recorded for controlling the normally conducting vacuum tube for the purpose of discharging said capacitance for each such signal, said normally nonconducting vacuum tube also having a screen grid, and a normally nonconducting vacuum tube provided with adjustable gain control responsive to the value of the voltage across the capacitance for controlling the voltage of said screen grid for the purpose of selectively blocking the conduction of said normally nonconducting vacuum tube when it would otherwise conduct in response to certain signals.

4. In a sweep circuit for cathode ray oscillographs, a sweep capacitance, a circuit for charging said capacitance including means for adjusting the charging rate, a multiple stage electronic control circuit for suddenly discharging said capacitance in response to a signal voltage, said control circuit including means for rendering the control operation independent of the polarity, wave form, and crest value of the signal voltage, said control circuit including an intermediate normally nonconducting vacuum tube having a first control grid for normally causing conduction of the tube in response to signals to effect the discharge of said sweep capacitance and a second control grid capable by voltage control of blocking such conduction of the tube, and means including a normally nonconducting vacuum tube provided with adjustable gain control responsive to the value of the charge of said capacitance for controlling the voltage on said second control grid for the purpose of selectively controlling the relation between the signal and sweep frequency.

5. In a sweep circuit for cathode ray oscillographs, a capacitance, a circuit for charging said capacitance, a grid controlled gaseous discharge tube for discharging said capacitance, and means for tripping said tube in response to a signal, the tripping of said tube being independent of the voltage of the capacitance at the time of discharge, the temperature of the tube and the crest voltage, polarity, and wave form of the signal, said means including electronic apparatus for controlling the voltage applied to the grid of said gaseous discharge tube from a value which is at least 200 volts negative to a value which is at least 200 volts positive both with respect to the cathode of said gaseous discharge tube, said change in voltage swinging from the negative value when the tube is nonconducting to the positive value to trip the tube in less than ¼ microsecond.

6. A sweep circuit for a cathode ray oscillograph together with means for synchronizing the operation thereof with a signal voltage comprising a capacitance, a charging circuit therefor, including means for controlling the charging rate, a grid controlled gaseous discharge tube for discharging said capacitance, vacuum tube means responsive to a signal voltage for producing substantially instantaneous voltage pulses of a given polarity for each signal voltage of either polarity above a minimum value, said pulses being independent of the wave form and crest values of the signal voltage variation, normally nonconducting vacuum tube having first and second control grids, the first of which controls the conduction of its tube in response to said voltage pulses, a normally conducting vacuum tube which is rendered nonconducting when the normally nonconducting tube conducts, the conducting period of the first mentioned vacuum tube and the nonconducting period of the second mentioned vacuum tube being of the same duration as said pulses, the normally conducting vacuum tube when conducting impressing not less than 200 volts negative on the grid of said gaseous tube, means for impressing not less than 200 volts positive on the grid of said gaseous tube at other times, and adjustable electronic control means responsive to the value of the charge on said capacitance for controlling the voltage on said second control grid so as to selectively block the conduction of the normally nonconducting vacuum tube upon the occurrence of certain of said voltage pulses.

7. In a sweep circuit for cathode ray oscillographs, a sweep capacitor, means for gradually charging said sweep capacitor, said sweep capacitor being adjustable for the purpose of varying the charging rate, electronic switching means for momentarily closing a discharge circuit for said sweep capacitor to allow its discharge, the duration of closure of said discharge circuit being determined by the time duration of pulses controlling the operation of said electronic switching means, means responsive to signaling voltages for producing such controlling pulses, adjustable means for controlling the time duration of such pulses for the purpose of controlling the duration of closure of said discharge circuit, and common means for adjusting said pulse duration control means and said sweep capacitor such that the sweep capictor will always be discharged to substantially the same value and with a minimum time duration of closure of its discharge circuit.

8. A sweep circuit for cathode ray oscillographs, comprising a variable sweep capacitor, a circuit for gradually charging said capacitor, a grid controlled gaseous discharge tube through which said sweep capacitor is suddenly discharged, electronic means including a normally conducting grid controlled vacuum tube for controlling the grid voltage of said gaseous discharge tube from a high negative voltage to a high positive voltage and back to a high negative voltage to cause the discharge and cutoff of said sweep capacitor before said capacitor is completely discharged, means responsive to signal voltages for producing pulses for controlling the time of cutoff of said normally conducting grid discharge tube said pulse producing means including a pulse duration variable capacitor for varying the time duration of the pulses, and common means for simultaneously adjusting the variable sweep capacitor and the pulse duration capacitor so that the pulses will be of the same time duration as the discharge time of said sweep capacitor.

CARL R. SEAWARD.

REFERENCES CITED

The following references are of record in the file of this patent:

UNITED STATES PATENTS

| Number | Name | Date |
| --- | --- | --- |
| Re. 22,055 | Toulon | Mar. 24, 1942 |
| 1,978,461 | Hoover et al. | Oct. 30, 1934 |
| 2,403,487 | Bedford | July 9, 1946 |
| 2,428,799 | Hayes | Oct. 14, 1947 |

FOREIGN PATENTS

| Number | Country | Date |
| --- | --- | --- |
| 442,747 | Great Britain | Feb. 14, 1936 |